United States Patent
Daume

(10) Patent No.: US 7,018,221 B2
(45) Date of Patent: Mar. 28, 2006

(54) DEVICE FOR CONTACTING IN PARTICULAR ELONGATED, ILLUSTRATIVELY SUBSTANTIALLY CYLINDRICAL BODIES SUCH AS CABLES OR PIPES/TUBES

(75) Inventor: Britta Daume, Burgwedel (DE)

(73) Assignee: Daume Patentbesitzgesellschaft mbH & Co. KG, Burgwedel (DE)

( * ) Notice: Subject to any disclaimer, the term of this patent is extended or adjusted under 35 U.S.C. 154(b) by 658 days.

(21) Appl. No.: 09/491,841

(22) Filed: Aug. 23, 1999

(65) Prior Publication Data

US 2002/0058430 A1    May 16, 2002

(30) Foreign Application Priority Data

Aug. 24, 1998   (DE)  ............................ 298 15 063 U
Sep. 9, 1998    (DE)  ............................... 198 41 199

(51) Int. Cl.
    *H01R 13/648* (2006.01)
(52) U.S. Cl. .................. 439/100; 439/98; 439/799
(58) Field of Classification Search ......... 439/98–100, 439/49, 283, 584, 799, 394, 427, 437; 200/250
    See application file for complete search history.

(56) References Cited

U.S. PATENT DOCUMENTS

| 2,279,866 A |   | 4/1942  | Ellinwood |          |
|-------------|---|---------|-----------|----------|
| 2,423,627 A | * | 7/1947  | Tinnerman | 439/100  |
| 2,432,492 A | * | 12/1947 | Tinnerman | 439/780  |
| 3,749,814 A |   | 7/1973  | Pratt     |          |
| 6,101,712 A | * | 8/2000  | Wright    | 439/394  |

FOREIGN PATENT DOCUMENTS

| DE | 22 25 060    | 5/1972  |
| DE | 41 24 968 A1 | 7/1991  |
| EP | 0 466 276 A1 | 1/1992  |
| EP | 0 744 788 A1 | 11/1996 |

\* cited by examiner

*Primary Examiner*—Tho D. Ta
(74) *Attorney, Agent, or Firm*—Shlesinger, Arkwright & Garvey LLP

(57) ABSTRACT

A connector for providing an electrical connection to a coaxial cable, the connector comprises a base member adapted to be secured around a coaxial cable, a metal band member formed as part of the base member, and at least one protrusion extending from and unitary with the metal band member for providing electrical contact to a conductor portion of the coaxial cable.

19 Claims, 8 Drawing Sheets

DEVICE FOR CONTACTING IN PARTICULAR ELONGATED, ILLUSTRATIVELY SUBSTANTIALLY CYLINDRICAL BODIES SUCH AS CABLES OR PIPES/TUBES

FIELD OF THE INVENTION

The present invention relates to a device for contacting, elongated, substantially cylindrical bodies such as cables, pipes or tubes.

BACKGROUND OF THE INVENTION

A device of the above kind described above is known from the European patent document A 0 744 788. It is used to set up an electrically conducting connection between a pipe or a bared outer conductor of a coaxial cable and a conductor, for example a grounding cable. This device comprises a base structure in the form of a clamp, the base structure fitted with a band-shaped metal part imbedded in an elastic material, for example rubber, thereby forming sealing lips mutually spaced in the axial direction of the base structure. The sealing lips are fitted with rest surfaces which, when in the assembled position, allow the base structure to rest against the body to be contacted, the sealing lips sealing a space between the base structure and the body to be contacted against penetration of air and/or moisture. Moreover the above device comprises contact means to implement an electrically conducting connection between the body to be contacted and a conductor, for example a grounding cable. In the above device, the contact means consist of a separate adapter in the form of a band copper braid resting when in the assembled position against the body to be contacted and against the side of the band-shaped metal part of the base structure facing the body to be contacted. The adapter is joined to the base structure adhesively or by spot welds.

The above device incurs a drawback in that its manufacture entails connecting the separate adapter in an additional operational stage to the base structure and therefore is labor intensive and costly. This device suffers from a further drawback in that during spot bonding of the adapter to the base structure, the adapter may slip and therefore not be affixed in a desired position to the base structure. Accordingly, assembly of the above device may require detaching the adapter from the base structure to move it into the desired position. Such a procedure is labor intensive and raises assembly costs. Moreover the connection implemented solely by spot welds presents a danger in that the adapter may come loose off of the base structure and be lost. In that instance, before the known device is assembled, a new adapter must be secured, entailing further complexity of manufacture and increasing both material and assembly costs.

OBJECTS AND SUMMARY OF THE INVENTION

The objective of the present invention is to create a device which shall be free of the drawbacks of the above noted prior art device, that is, it shall permit simple and economical manufacture and installation.

The disclosure of the present invention abandons the concept of forming the contact means implementing an electrically conducting connection between the body to be contacted and a conductor, for instance a grounding cable, by means of a spot-bonded adapter. Instead, the concept of the present invention is to provide a contact means that is part of the base structure. For that purpose the present invention provides a base structure having at least one contact protrusion made of an electrically conducting material. A separate adapter, for example a band copper braid, is no longer required and as a result, manufacture of the device of the present invention is simplified and made more economical.

Because the contact means is formed as part of the base structure, there is no danger of loss as there is for the above noted prior art devices.

The shape, size and position of the, or each, contact protrusion of the present invention can be selected within wide limits in accordance with the desired application requirements. The number of contact protrusions as well can be selected within wide limits. In a variant of the present invention the, or each, contact protrusion consists of an element firmly bonded to the base structure. For example the, or each, contact protrusion may comprise sheetmetal firmly joined to the sheetmetal of the base structure by welding and projecting from the base structure toward the body to be contacted. Because of the thorough bonding of the contact-protrusion forming part to the base structure, it is firmly held at the base structure. Welding permits thorough bonding of the two components in a simple and economic manner and as a result, the manufacturing costs of the device of the present invention are low.

The, or each, contact protrusion of the present invention may be constructed of any material that provides good electrical conduction so long as the contact protrusion, when in the assembled position between the body to be contacted and an electrically conducting conductor connected to the contact protrusion, for example a grounding cable, sufficiently conducts to assure shunting of any currents through the grounding cable as in the case of lightning. In order to minimize as much as possible the electrical resistance of the contact protrusion the, or each, contact protrusion of the present invention is metallic.

In an especially advantageous embodiment of the present invention the, or each, contact protrusion is integral with the base structure or part thereof. In this manner, a separate component is no longer is required to constitute the contact means. This feature substantially simplifies manufacturing of the device according to the present invention and makes it more economical.

In a further embodiment the, or each, contact protrusion is elastically deforming in a manner so that when in the assembled position, it will rest in resilient manner against the electrically conducting part of the body to be contacted. An especially reliable electrical connection is achieved in this embodiment due to the resilient application of the contact protrusion against the electrically conducting part of the body to be contacted. Furthermore, the resilient application of the, or each, contact protrusion compensates for variation of component tolerances.

In one embodiment of the invention, the electrically conducting connection of the, or each, contact protrusion and the body to be contacted may be further improved by spring biasing the, or each, contact protrusion toward the body to be contacted. By appropriately selecting a desired spring bias, the force with which the, or each, contact protrusion in the assembled position rests against the body to be contacted can be selected within a wide range of limits in order to meet the requirements of a particular application.

In the present invention, the base structure may be made substantially rigid. However, an appropriate embodiment provides that the base structure is flexible. In this embodiment the base structure conforms, on account of its flexibility, to the surface of the body to be contacted. This feature permits contacting against highly non-planar or curved bodies. The bodies to be contacted may be varied, for example, they may be planar, bar-shaped, arbitrarily bent or curved or tubular and of an arbitrary cross-section.

In another embodiment, the base structure comprises a band-shaped contact element made of an electrically conducting material, preferable a metal. In variations of this embodiment, the base structure is provided, at its side which faces the body to be contacted, with at least one protrusion at which the contact element is held and thus forms the contact protrusion. The or each contact protrusion is thus formed at the side of the contact element which faces the body to be contacted.

In another especially advantageous variation of the above embodiment the, or each, contact protrusion comprises an embossing in the contact element. If for example the contact element is a metal band, the metal band is appropriately embossed to form the, or each, contact protrusion. This simplified design may be manufactured economically. The shape and size of the contact protrusion may be selected within a wide range of limits by appropriately embossing the metal band.

In a variation of the above embodiment the, or each, embossing consists of a bulge which, when in the assembled position, is cross-sectionally convex toward the body to be contacted and in a top view is circular, or in the form of a a bead projecting toward the body to be contacted. For example, a contact protrusion may be provided by embossing the metal band with a bulge that is cross-sectionally convex toward the body to be contacted and which, in a top view, is circular. In this manner, the or each, contact protrusion may be formed in a simple manner during manufacture. When attaching the device of the present invention to a body to be contacted, the contact protrusion is initially in spot form, however following elastic deformation it becomes planar as it comes to rest against the body to be contacted. As a result, a reliable electrically conducting connection is achieved in the desired manner. In a corresponding manner, beads of arbitrary shapes may be embossed into the metal band to form contact the contact protrusions. The contact protrusions of this embodiment consist of embossings without openings which might otherwise admit external air and/or humidity into the contact zone. Regarding contacting pipes, the device of the present invention may consist solely of a clamping band, the side of the band facing the pipe to be contacted when in the assembly position comprising sealing lips. This embodiment is especially simple and economical to manufacture.

In another embodiment of the present invention the, or each, contact protrusion consists of a blade projecting toward the side of the base structure which when in the assembled position faces the body to be contacted, the, or each, blade optionally being stamped out of the contact element in a further variation. This embodiment is especially simple and economic manufacture.

In another embodiment, a portion of the contact element is made to pass out of the base structure when in its assembled position to its side facing away from the body to be contacted or, the contact element is connected in electrically conducting manner to an element passing out of the side of the base structure. In this embodiment, the contact element, when in the assembled position, may be contacted from the outside, for example by attaching a grounding cable to the outside element. This feature facilitates assembly of the device of the invention.

Depending upon particular requirements, the base structure of the present invention may have an arbitrary design, for example it may be flat to connect to a flat bodies, or be bent or curved to contact a bent or curved bodies. For contacting elongated, substantially cylindrical bodies, the base structure is designed in such manner that when in the assembled position, it encloses the body to be contacted in an annular manner or like a bush. The base structure of this embodiment is maintained reliably against the body to be contacted.

In another appropriate embodiment, the base structure is in the form of a clamp which can be tensioned around the body to be contacted. In this embodiment, there is increased reliability yet connecting the device of the invention to the body to be contacted is even more simple.

In regard to the two above embodiments, the, or each, contact protrusion is a radial projection.

In a variant of the above embodiment, the, or each, contact protrusion runs in a circumferential direction of the base structure and substantially over the full length of the base structure. As a result, there is a large area of contact with the body being contacted and therefor a reliable, electrically conducting connection. The large area contact with the body to be contacted substantially negates the effects of component tolerances on the electrical connection between the device of the invention and the body to be contacted.

In another variant, at least two mutually spaced-apart contact protrusions preferably mounted along a circumferential line on the base structure and spaced apart are provided. In this manner contact is set up with the body to be contacted at several circumferential sites.

In another embodiment of the present invention, for example contacting of pipes or cables, the base structure consists of at least two mutually connectable parts which when in the assembled position are aligned consecutive along the circumference of the body to be contacted. In this embodiment the base structure consists of several segments. For example, the base structure may consist of two semi-annular parts.

In another and especially advantageous variation, the base structure is integral and open in the circumferential direction and is fitted at its free ends with brackets adapted to be joined to one another when in the assembled position. Because the base structure is integral, assembly of the device of the invention is made easier. By joining the brackets to each other, the device of the present invention is affixed more rapidly and in simple manner to the body to be contacted.

The brackets may be joined to each other in a variety of manner, for example being welded together. However an advantageous variation provides that the brackets shall be joined to each other by screws or a clamp. This feature further simplifies the assembly of the device of the present invention. Moreover the mutual connection of the brackets and hence the connection of the device of the present invention to the body to be contacted is detachable in this variation. As a result, the device of the present invention is optionally re-usable.

In another embodiment, the base structure comprises a part made of an elastic material to which the side facing the body to be contacted in the assembled position is connected. If the base structure is in the form of a clamp, the elastic part will deform as the clamp is tightened and as a result will tighten the contact element toward the body to be contacted, thereby implementing an especially reliable electrical connection to the body being contacted.

In the above embodiment the elastic part may form a coating of the contact element, or the contact element may be imbedded at least in part in the elastic material. In order to render the device of the invention optically more advantageous and/or to protect it against ambient effects, the contact element may be fitted with a thin, optionally colored film. However the contact element also may be fitted with the elastic material to achieve electrical insulation or otherwise be imbedded in it.

The elastic material may be selected within a wide range of limits in relation to the particular requirements. Advantageously the elastic material shall be an elastomer, in particular a thermoplastic elastomer. As a result the manufacturing costs of the device of the invention are lowered. Various other elastomers may be used, for example vulcanized rubber. Since the thermoplastic elastomers are easily processable, they are especially advantageous.

In a further variation of the embodiment including an elastic part, the contact element is connected to the radial inside surface of the elastic part, and a band-shaped tightening band to tighten the device of the present invention around the body to be contacted is attached to the radial outside surface of the elastic part, preferably in a firmly affixed manner. The clamp makes it possible to tighten the device of the invention around the body to be contacted, the contact element then being firmly pressed against the body and the elastic material between the clamp and the contact element being compressed, whereby the contact element is biased toward the body to be contacted. Due to the biasing action, a reliable electrical connection between the contact element and the body to be contacted is achieved even in the event tension of the tensioning part becomes slackened over time.

In another variation of the above embodiment, the tensioning part is metallic and the contact element is connected in an electrically conducting manner to the tensioning part. In this embodiment, a conductor, for example a grounding cable, may be readily connected to the externally accessible clamping part and, as a result of the electrical connection between the clamping part and the contact element, the body to be contacted is grounded in a desired manner.

In another variation, the contact element is fitted with terminals to hook up a conductor, for example a grounding cable, in a manner so that the conductor may be connected to the contact element when resting in the assembled position against the body to be contacted to provide an electrically conducting connection between the conductor and the body to be grounded. The terminals facilitate hooking up a conductor, for example a grounding cable.

Concerning the embodiment where the base structure and the brackets are an integral unit, a variation of this embodiment provides that the contact element shall comprise the brackets or extends into the brackets and at least one aperture is provided in one of the brackets and at least one threaded borehole of the other of the brackets, the borehole positioned opposite the aperture when in the assembled position, and in such manner that when in the assembled position the brackets are crossed by at least one, preferably metallic, electrically conducting screw extending through the aperture and engaging the threaded borehole to connect the brackets to each other and to a conductor, for example a grounding cable, the brackets thereby constituting the terminals. This embodiment is implemented in an especially easy and rapid manner and therefore may be economically assembled. The conductor is hooked up in a manner so that by using the at least one screw, on one hand the brackets are tightened to each other and on the other hand the conductor, is connected to the brackets in an electrically conducting manner by using, for example, a connecting grommet.

In a particularly advantageous variation of the elastic part embodiment, the elastic material will at least partly consists of an electrically conducting elastic material comprising at least one protrusion constituting the contact protrusion. Due to the electrical conductivity of the elastic material, the base structure may completely comprise elastic material and metal parts are not required. This feature enhances manufacture of the device of the invention. In addition, because the base structure is made of a single material, the device is readily recyclable.

In the above embodiment, electrically conducting masses or particles are appropriately imbedded in the elastic material to achieve electrical conductivity. By selecting the content of electrically conducting masses or particles for incorporation into the elastic material, conductivity may be selected within a wide range of limits depending upon particular requirements.

In a variation of the above embodiment, the elastic conducting masses or particles are distributed substantially uniformly in the elastic material. In this manner, the elastic material is uniformly conducting.

If for example the device of the present invention is used for purposes of contacting the outside surface of a metal pipe, it is sufficient that the contact protrusion project perpendicularly to the rest surface as far as the region of this surface and rests against it when in the assembled position. If on the other hand the device of the present invention is for contacting a bared coaxial-cable outer conductor standing back against an insulating sheath, the contact protrusion of the device of the present invention must sufficiently radially project so that when in the assembled position it rests against the bared outer conductor. A further variation of the present invention provides that the, or each, contact protrusion projects sufficiently beyond the rest surface when in the assembled position and perpendicular to it so that when in this assembled position it will come to rest against an electrically conducting segment of the body to be contacted, recoiling relative to a part of the body to be contacted against which rest the rest surfaces of the base structure. In this way it is therefore possible to implement electrically conducting contact with any recessed parts of the body to be contacted.

In another embodiment, the device of the present invention comprises sealing means to seal a space subtended between the body to be contacted and the device of the invention when in the assembled position against penetration by air and/or moisture. This embodiment reliably prevents interference, and consequent oxidation, by air and/or moisture which would otherwise penetrate the contact zone at the outer surface of the body to be contacted.

In a variation of the above embodiment, the sealing means comprises elastic sealing lips disposed at a side of the base structure facing the body to be contacted when in the assembled position, the lips being mutually apart in the axial direction of the base structure and running in a circumferential direction of the base structure and over its full length, and resting tightly against the outside surface of the body to be contacted when in the assembled position. When contacting elongated, fro example substantially cylindrical bodies such as pipes or cables using a device of the present invention comprising a base structure enclosing this body when in the assembled position, this embodiment will reliably seal and prevent air and/or moisture from entering the contact zone.

In another variation of the above embodiment comprising sealing means and an integral base structure having brackets, the sealing means comprise elastic sealing surfaces formed from the mutually facing bracket surfaces or an elastic material disposed between the surfaces when in the assembled position, the sealing surfaces resting closely against one another when in the assembled position or against the sealing element and tightly adjoining the sealing lips in a circumferential direction to the base structure. Sealing is further improved in this manner.

In another embodiment, the contact element and/or the clamp are made of brass and/or high-strength brass and/or of low-alloyed copper. The electrical conductivity of these materials is particularly good and therefore electrical resistance between a conductor such as a grounding cables and the body to be contacted will be low.

The invention is elucidated below in relation to various embodiments shown in the attached drawing.

DETAILED DESCRIPTION OF THE PREFERRED EMBODIMENTS

Figure 1:
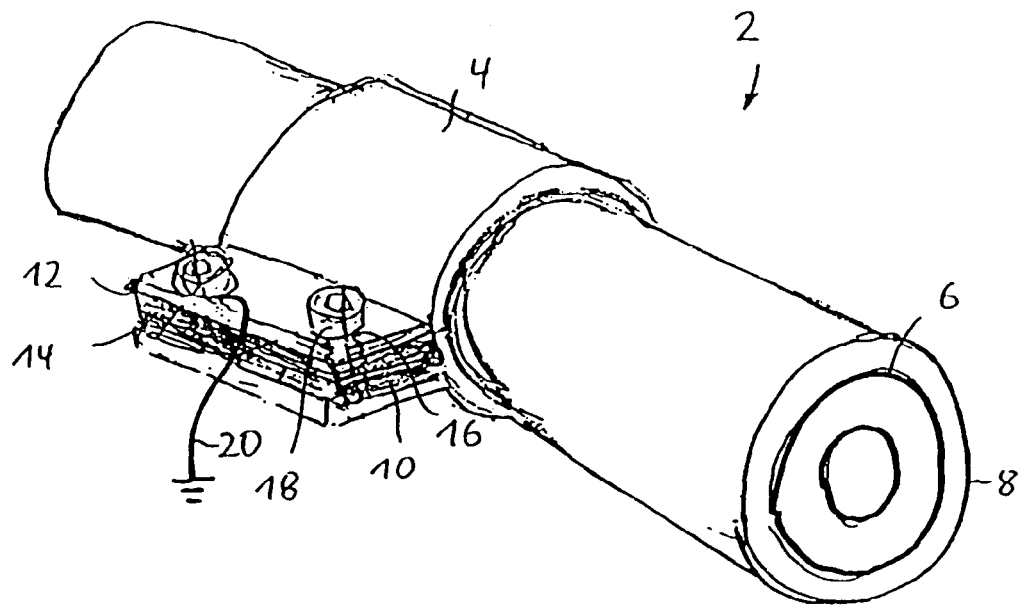
FIG. 1 is a schematic perspective of a first embodiment of a device of the present invention in the form of a clamp when in the assembled position.

Identical or corresponding components in the drawings are denoted by the same reference numerals.

FIG. 1 shows a device 2 according to the present invention comprising a flexible base structure 4 in the form of a clamp which when in the assembled position shown in the figure will rest against a conducting part of a body to be contacted. That is, it encloses, in the manner of a bushing, the bared outer conductor 6 of coaxial cable 8. In this embodiment the base structure 4 is integral, open in a circumferential direction and comprises a band-shaped metal contact element 10 fitted with brackets 12 and 14 which are substantially perpendicular to the clamp ends and which rest against each other when in the assembled position. Bracket 12 includes apertures 16 and bracket 14 includes threaded boreholes (not shown) which when in the assembled position, are disposed opposite apertures 16. Metal screws 18 extend through the apertures and engage the threaded boreholes to connect the brackets 12 and 14 and a conductor, for example a grounding cable 20.

In addition, the base structure 4 includes elastic part 22 constructed from elastic material, for example an elastomer, and especially a thermoplastic elastomer.

Figure 2:
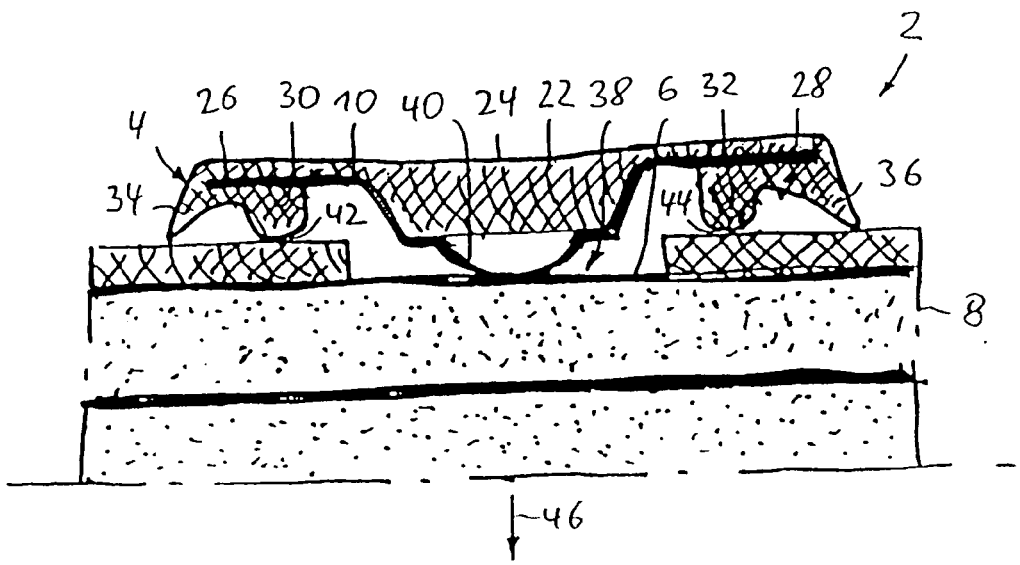
FIG. 2 is an axial sectional view of the device shown in FIG. 1.

In FIG. 2, elastic part 22 is shown to comprise the radial outside surface 24 of base structure 4 and contact element 10 is imbedded by its axial edges 26 and 28 into the elastic material forming the elastic part 22. Sealing lips 30 and 32 are mutually apart in the axial direction of the base structure 4 and are formed by the elastic material of the device 2 and disposed on the side of the base structure 4—and in particular at its radial inside surface—which when in the assembled position faces the body to be contacted. Additional sealing lips 34 and 36 are each axially external to sealing lips 30 and 32. It is emphasized that sealing lips 30 and 32 and additional sealing lips 34 and 36 substantially extend the full length of the base structure 4 in its circumferential direction and, when in the assembled position of the device 2 shown in FIG. 1, will tightly rest against the sheath of the coaxial cable 8. Sealing lips 34 and 36 seal a space defined, when in the assembled position shown in FIG. 1, between the base structure 4 and the coaxial cable 8 and which establishes a contact zone 38 for an electrically conducting connection between the device 2 and the outer conductor 6 of the coaxial cable 8.

To implement an electrically conducting connection between the device 2 of the present invention and an outer conductor 6 of a coaxial cable 8 to be contacted, the device 2 is fitted with contact protrusions one of which is shown in FIG. 2 by reference numeral 40. In cross-section, the contact protrusion is shown to be convex relative to the coaxial cable 8, while in top view it is substantially circular.

The device 2 of the present invention operates in the following manner.

To provide an electrically conducting connection between the outer conductor 6 of a coaxial cable 8 and a grounding cable 20, the device 2 is placed around a bared region of the coaxial cable 8 and tightened by screws 18. In the process, the base structure 4, by means of rest surfaces 42 and 44 and the sealing surfaces of the sealing lips 30 and 32, comes to rest against the sheath of the coaxial cable 8. The contact protrusion 40 projects perpendicular to the rest surfaces 42 and 44, and in a direction shown by an arrow 46 in FIG. 2 when in the assembled position and sufficiently beyond rest surfaces 42 and 44 so that, in this assembled position, it comes to rest against the outer conductor 6 of the coaxial cable 8 which is set back, and an electrically conducting connection is thereby implemented between the contact element 10 and the outer conductor 6. Because the grounding cable 20 is connected though the screws 18 to the contact element 10, the desired electrically conducting connection has been set up in this manner, and the outer conductor 6 is now grounded.

The contact protrusion 40 elastically deforms during tightening of the base structure 4 so that the protrusion rests in a resilient manner against the outer conductor 6 of the coaxial cable 8. In this manner, a reliable electrical connection between the grounding cable 20 and the outer conductor 6 is achieved.

Because contact protrusion 40 is a part of base structure 4, a separate element, for example an adapter, will no longer be required. This features simplifies the design of the device 2 of the present invention and renders its manufacture more economical.

Figure 3:
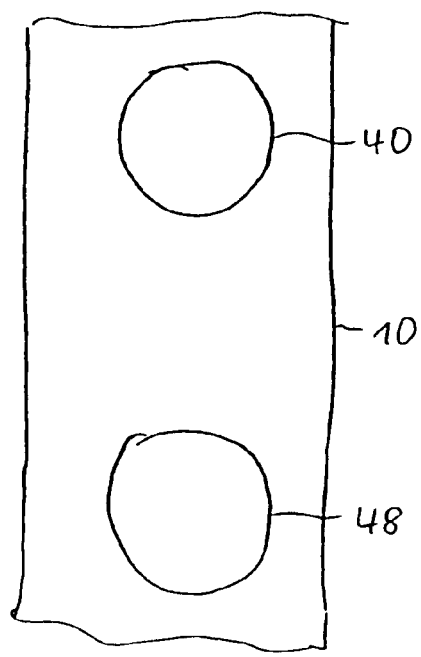
FIG. 3 is a schematic elevational view showing the radial inside surface of a device of the invention of FIG. 1.

FIG. 3 is an elevational view showing the radial inside surface of the base structure 4. The contact protrusion 40 and contact protrusion 48 each comprise a circular protrusion formed in contact element 10.

Figure 4:
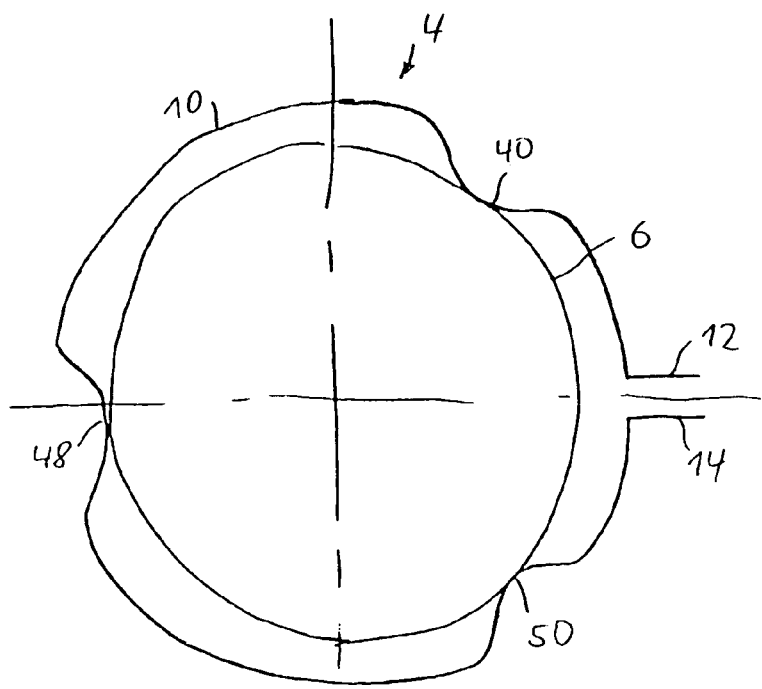
FIG. 4 is a schematic radial sectional view of the device of the invention shown in FIG. 1 when in the assembled position.

FIG. 4 illustrates a schematic, radial section of the device 2 and showing another contact protrusion 50 and that each of contact protrusions 40, 48 and 50 are mutually equidistant in the circumferential direction of base structure 4.

Figure 5:
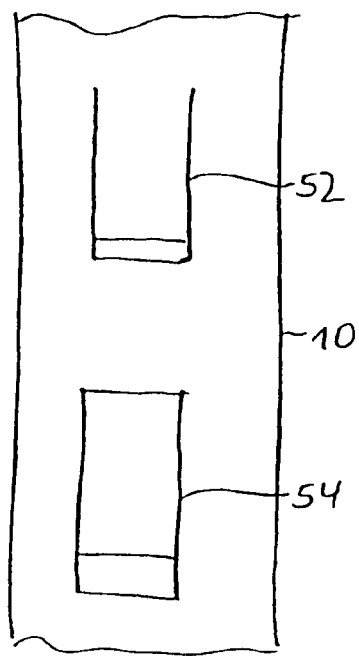
FIG. 5 is a representation similar to FIG. 3 of a second embodiment of the device of the present invention.

FIG. 5 illustrates an elevation of the radial inside surface of a second embodiment of the device 2 of the invention whereby the contact protrusions consist of blades 52 and 54 stamped out of contact element 10.

Figure 6:
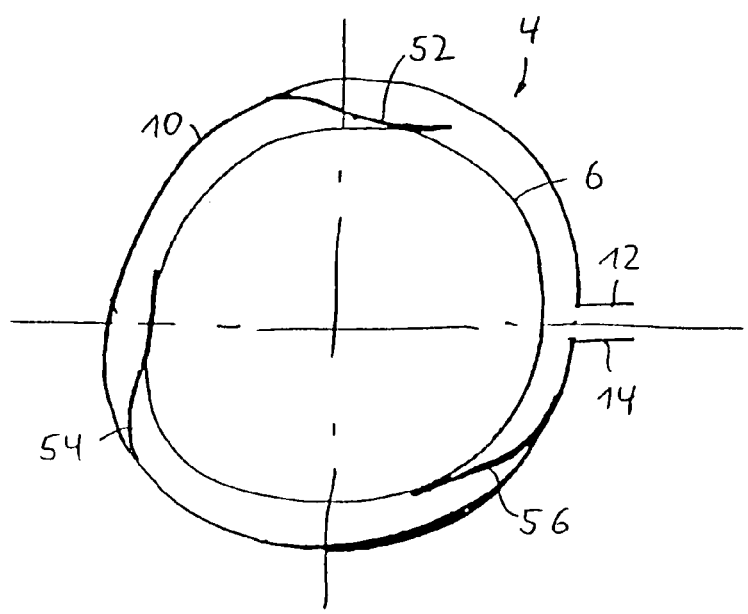
FIG. 6 is a view similar to FIG. 4 and showing the device of the invention shown in FIG. 5 when in the assembled position.

FIG. 6 illustrates a radial section of the device of the invention shown in FIG. 5 and showing another blade 56 so that each of blades 52, 54 and 56 are equidistant from each other in a circumferential direction of the base structure 4 and are bent toward the side of the base structure 4 facing the outer conductor 6 to be contacted when in an assembled position to project such that they rest resiliently against outer conductor 6.

Figure 7:
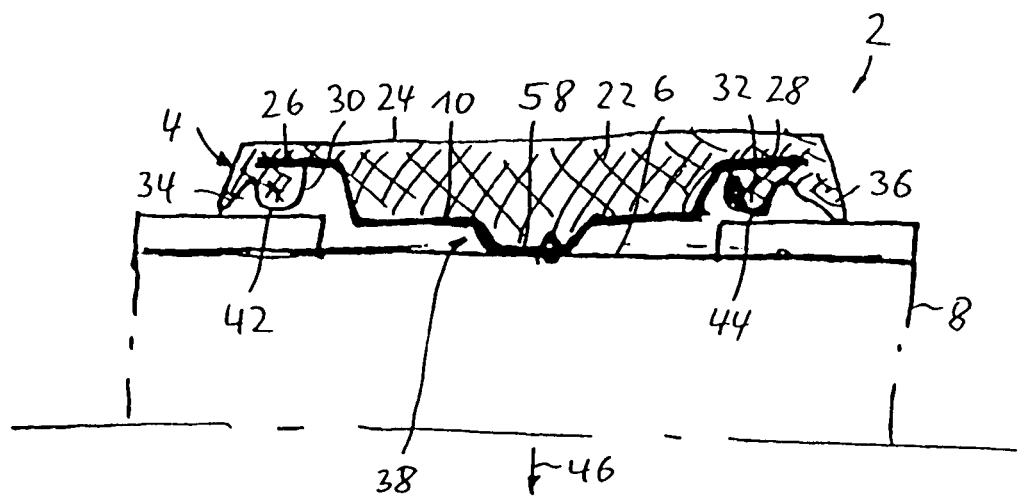
FIG. 7 is a view similar to FIG. 2 and showing a third embodiment of the device of the present invention.

FIG. 7 illustrates an axial section of a third embodiment of the device of the invention 2 whereby the protrusion of contact element 10 forming the contact consists of a bead 52 running in a circumferential direction of the base structure 4 substantially over the entire length of the base structure 4 in that direction. The elastic part 22 closely rests against the contact element 10 in the zone of the bead 58.

Figure 8:
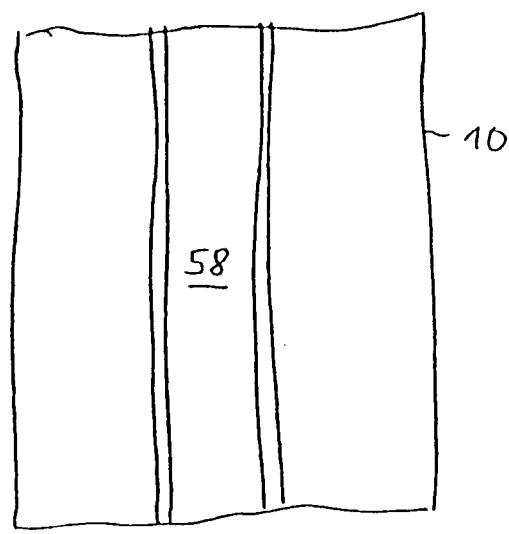
FIG. 8 is a view similar to FIG. 3 and showing the device of the invention of FIG. 7.

FIG. 8 illustrates a schematic elevation view showing the radial inside surface of the device 2 shown in FIG. 7.

Figure 9:
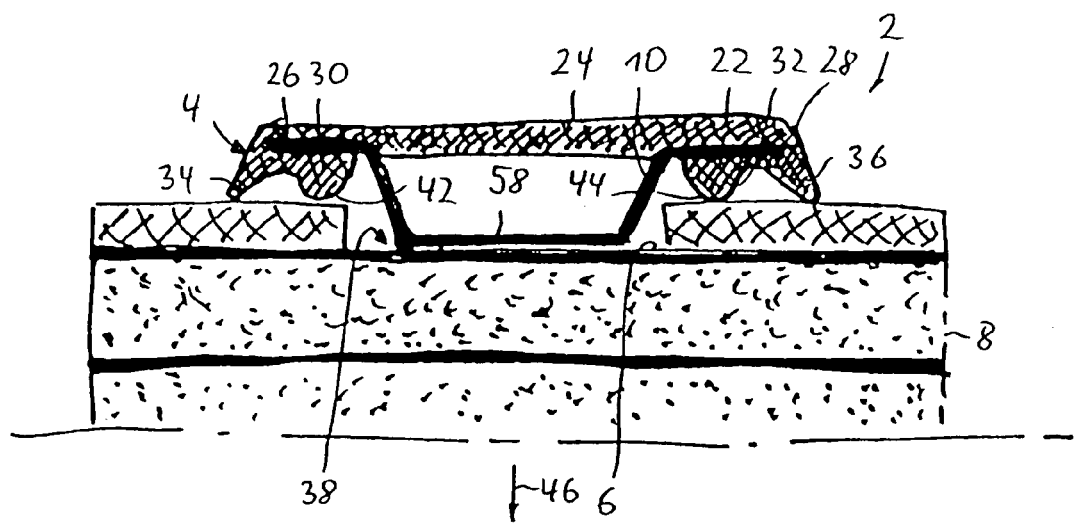
FIG. 9 is a view similar to FIG. 2 and showing a fourth embodiment of the device of the present invention.

FIG. 9 illustrates an axial section of a fourth embodiment of the present invention whereby elastic part 22 is mounted a distance away from the contact element 10 in the zone of the bead 58.

Figure 10:
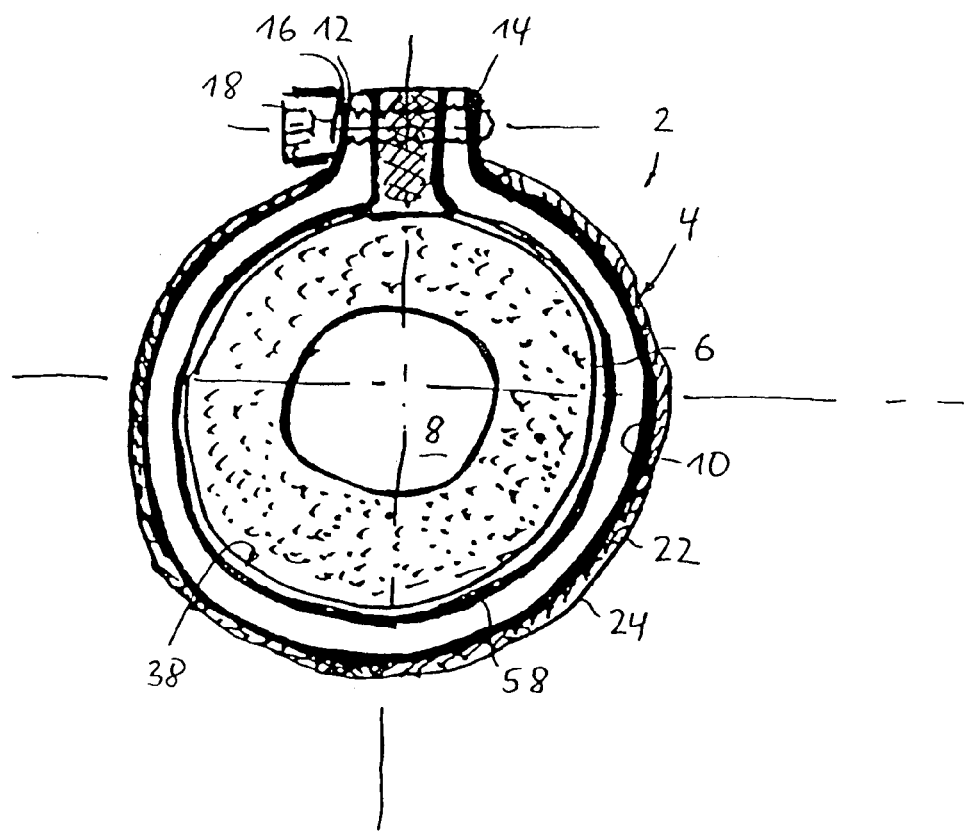
FIG. 10 is a view similar to FIG. 4 and showing the invention of FIG. 9.

FIG. 10 illustrates a radial section of the device shown in FIG. 9.

Figure 11:
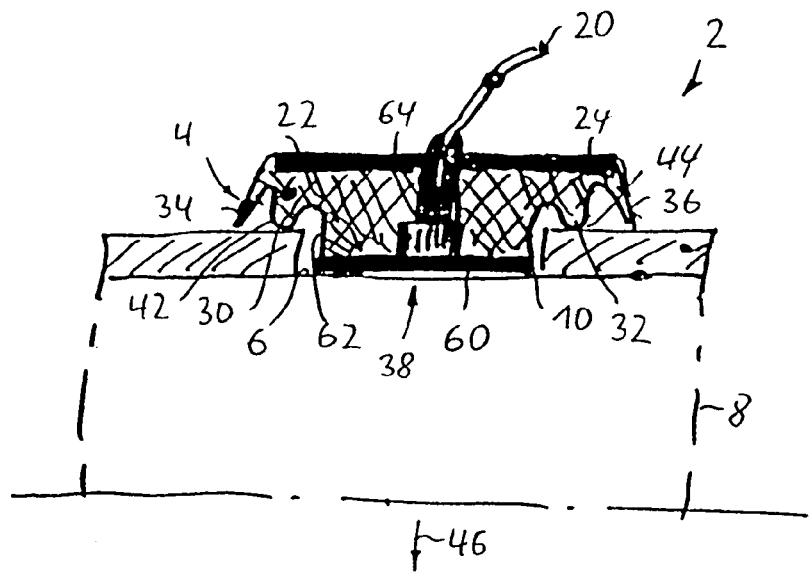
FIG. 11 is a view similar to FIG. 2 and showing a fifth embodiment of the device of the present invention.

FIG. 11 illustrates an axial section view of a fifth embodiment of the device 2 of the present invention whereby contact element 10 consists of a flat, unembossed, metal band. The base structure 4 is fitted at its elastic part 22 with a radial protrusion 62 for the purpose of forming a contact protrusion 60. Contact element 10 is affixed to the radial inside surface of the protrusion 62 and in this manner forms the contact protrusion 60. In this embodiment the base structure 4 comprises a metal tensioning element 64 connected to the outside surface of the elastic part 22 to thereby tension the device 2 around a body to be contacted. The adapter 66 leading to the radially outside surface of the base structure 4 electrically connects the contact element 10 to the tensioning element 64. The adapter 66 connects the grounding cable 20 to the contact element 10. When tightening the device 2 around the outer conductor 6 of the coaxial cable 8 to be contacted, contact protrusion 60 of the contact element 10 is caused to be firmly compressed against the outer conductor 6 and the elastic part 22 is compressed as well, thereby forming a spring means to bias the contact protrusion 60 toward the outer conductor 6.

Figure 12:
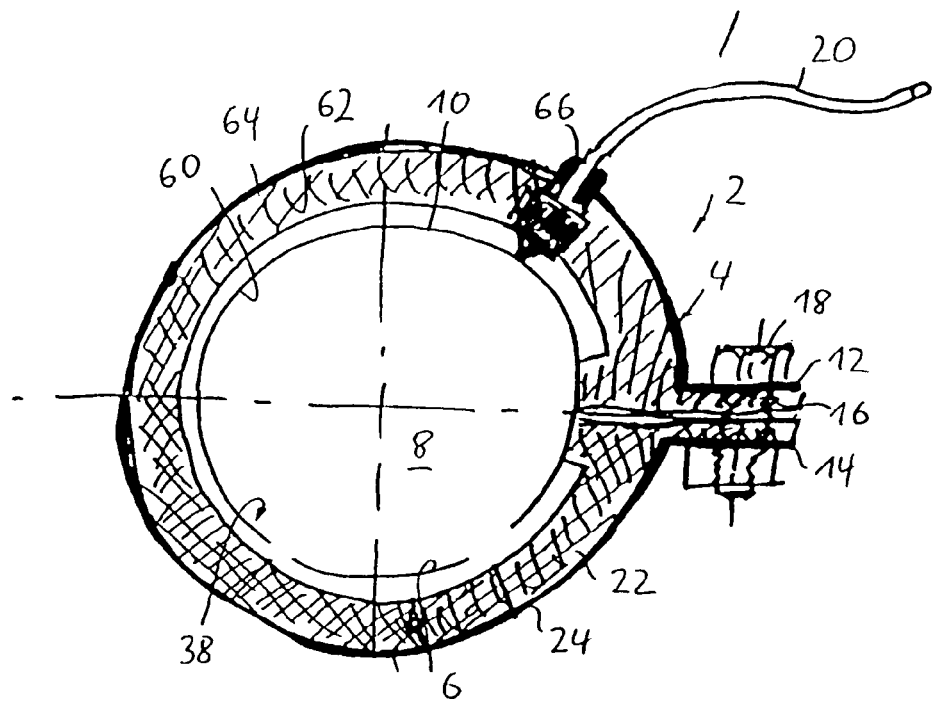
FIG. 12 is a view similar to FIG. 4 and showing the device of the invention of FIG. 11.

FIG. 12 is a schematic radial section of the device of FIG. 11.

Figure 13:
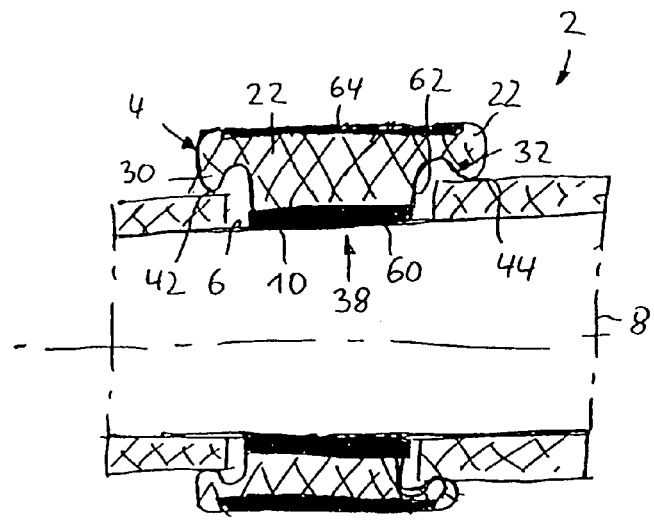
FIG. 13 is a view similar to FIG. 2 and showing a sixth embodiment of the device of the present invention.

FIG. 13 shows a sixth embodiment of the device of the invention wherein ends 68 and 70 of contact element 10 pass out of the base structure 4 and in the vicinity of the brackets 12 and 14. As a result, grounding cable 20 can be connected to the ends 68 and 70 of the contact element 10.

Figure 14:
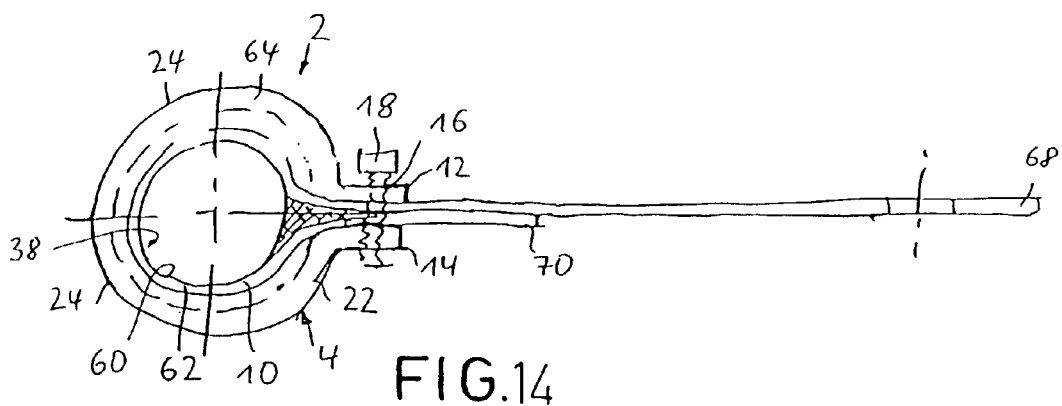
FIG. 14 is a view similar to FIG. 4 and showing the device of the invention of FIG. 13.

FIG. 14 is a schematic radial section of the device of FIG. 13.

Figure 15:
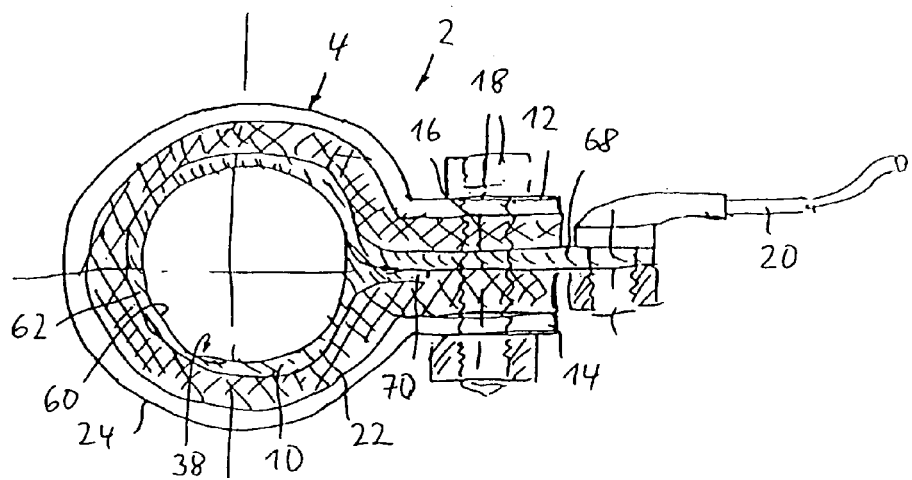
FIG. 15 is a view similar to FIG. 4 and showing a seventh embodiment of the device of the present invention.

FIG. 15 illustrates a seventh embodiment similar to that of FIG. 14 wherein merely one end 68 of the contact element 10 passes out of the base structure 4.

Figure 16:
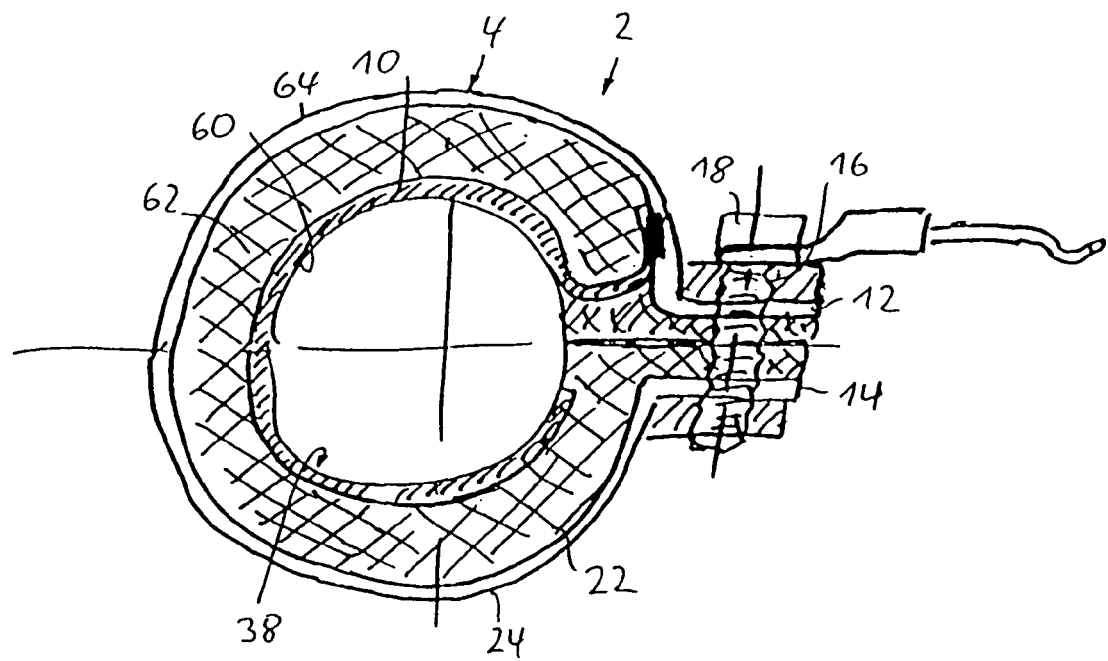
FIG. 16 is a view similar to FIG. 4 and showing an eighth embodiment of the device of the present invention.

FIG. 16 shows an eighth embodiment similar to that of FIG. 12 wherein the one end 68 of the contact element 10 runs radially outward through part 22 and to tensioning element 64 and in this manner is connected in an electrically conducting manner to the tensioning element 64.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. A device for providing electrical contact to an outer conductor of a coaxial cable, the outer conductor having bare segments, said device comprising:
   a) a base structure adapted to be tensioned around a coaxial cable, said base structure provided with an interior surface and an exterior surface;
   b) sealing lips operatively associated with said base structure and extending from said interior surface thereof, said sealing lips for providing a seal between said base structure and a coaxial cable when said base structure is tensioned therearound;
   c) a band shaped, electrically conducting contact element attached to said base structure, said band shaped, electrically conducting contact element including at least one resilient, electrically conducting contact protrusion formed integrally therewith and biased to extend beyond said sealing lips so that when said base structure is tensioned around a coaxial cable said resilient, electrically conducting contact protrusion will rest against the bare segments of the coaxial cable and provide electrical contact therewith.

2. Device as claimed in claim 1, and wherein said at least one resilient, electrically conducting contact protrusion is metallic.

3. Device as claimed in claim 1, and wherein said base structure is flexible.

4. Device as claimed in claim 1, and wherein said base structure is a band-shaped contact element constructed from electrically conducting material.

5. Device as claimed in claim 1 and wherein said at least one resilient, electrically conducting contact protrusion is an embossing in said band shaped, electrically conducting contact element.

6. Device as claimed in claim 1 and wherein said base structure is a clamp adapted to be tensioned around the coaxial cable to be contacted.

7. Device as claimed in claim 1 and wherein said band shaped, electrically conducting contact element is fitted with terminals to hook up to a conductor.

8. Device as claimed in claim 1 and wherein said base structure is configured in such a manner so as to enclose the coaxial cable to be contacted in an annular manner.

9. Device as claimed in claim 8 and wherein said at least one resilient, electrically conducting contact protrusion is a radial projection extending from said band shaped, electrically conducting contact element.

10. Device as claimed in claim 8 and further comprising:
a) additional resilient electrically conducting contact protrusions, said additional resilient electrically conducting contact protrusions are mounted in a mutually spaced manner and in a circumferential direction of said base structure and in alignment along a single circumferential line thereof.

11. Device as claimed in claim 8 and wherein said base structure is integral and circumferentially open and includes first and second opposite ends each of which are provided with respective brackets that are connectable.

12. Device as claimed in claim 11 and wherein said respective brackets are adapted to be connected to each other with screws.

13. Device as claimed in claim 11 and wherein each of said respective brackets of said base structure first and second opposite ends is provided with sealing surfaces, said sealing surfaces consisting of mutually facing interior surfaces, each of said mutually facing interior surfaces provided on a separate one of said respective brackets, said respective brackets extending from said base member and at least one of which is made of an elastic material adapted to sandwich an elastic sealing element therebetween when in an assembled position.

14. Device as claimed in claim 1 and wherein said base structure includes an elastic part, said elastic part having a surface coextensive with said base structure interior surface and adapted for connection to said band shaped, electrically conducting contact element.

15. Device as claimed in claim 14 and wherein said elastic part is made of an elastic material and said band shaped electrically conducting contact element is at least one of imbedded in said elastic part or secured to an exterior surface thereof.

16. Device as claimed in claim 14 and wherein said elastic part is formed from a thermoplastic elastomer.

17. A device for providing electrical contact to an outer conductor of a coaxial cable, the outer conductor having bare segments, said device comprising:
a) a base structure adapted to be tensioned around a coaxial cable, said base structure provided with an interior surface and an exterior surface;
b) sealing lips operatively associated with said base structure and extending from said interior surface thereof, said sealing lips for providing a seal between said base structure and a coaxial cable when said base structure is tensioned therearound;
c) a band shaped, electrically conducting contact element attached to said base structure, said band shaped, electrically conducting contact element including at least one resilient, electrically conducting contact protrusion formed integrally therewith and biased to extend beyond said sealing lips so that when said base structure is tensioned around a coaxial cable said resilient, electrically conducting contact protrusion will rest against the bare segments of the coaxial cable and provide electrical contact therewith; and
d) said at least one resilient, electrically conducting contact protrusion consists of a blade projecting away from said base structure interior surface.

18. Device as claimed in claim 17 and wherein said blade is stamped out of said band shaped, electrically conducting contact element.

19. Device as claimed in claim 17 and wherein said band shaped, electrically conducing contact element includes first and second respective brackets and one of said first and second brackets comprises at least one aperture and the other of said first and second brackets comprises at least one threaded borehole operatively associated with said at least one aperture and further including at least one electrically conducting metal screw adapted for passing through said at least one aperture and engaging said at least one threaded borehole for providing a connection therebetween.

* * * * *